June 28, 1938.  N. G. HAYES  2,122,252
WIRE CONNECTER
Filed March 4, 1935  2 Sheets-Sheet 1
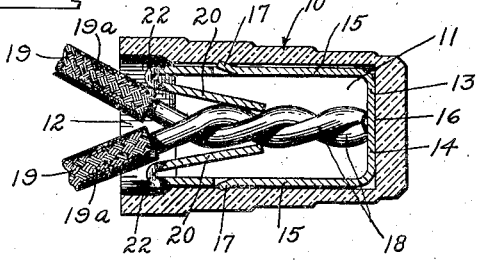
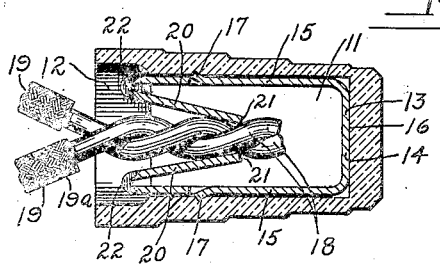
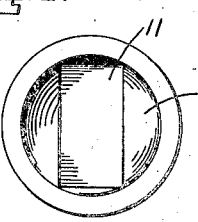
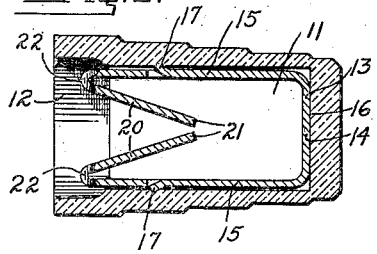
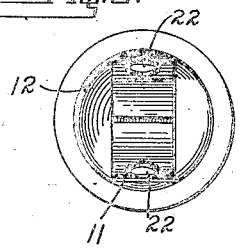
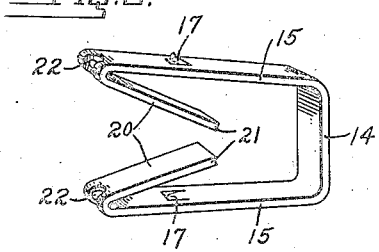
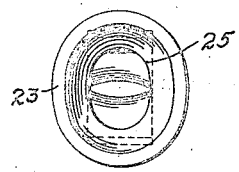
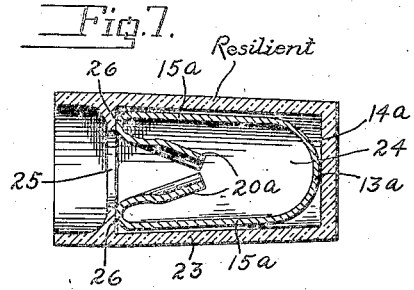
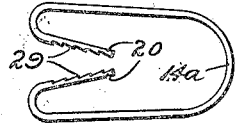
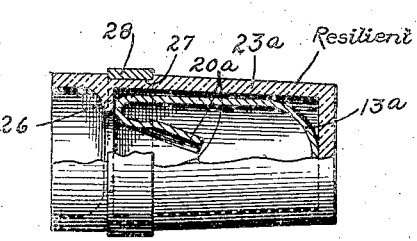
INVENTOR.
Neil G. Hayes
BY
ATTORNEY.

June 28, 1938.    N. G. HAYES    2,122,252
WIRE CONNECTER
Filed March 4, 1935    2 Sheets-Sheet 2
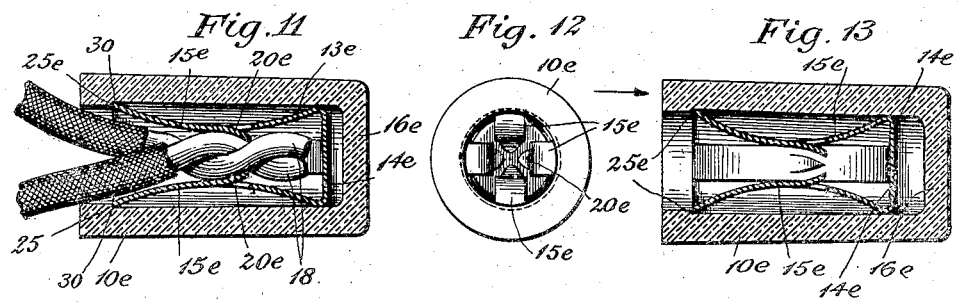
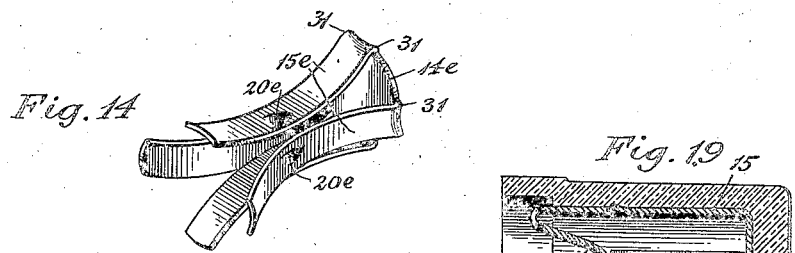
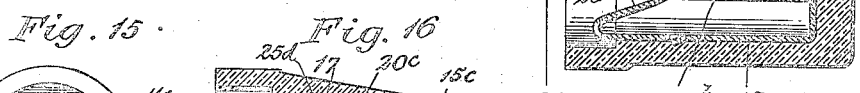
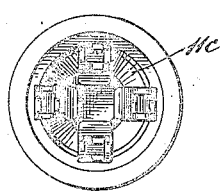
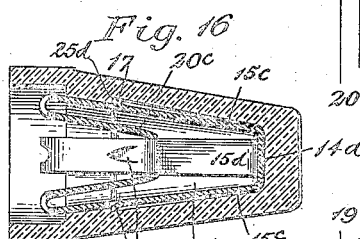
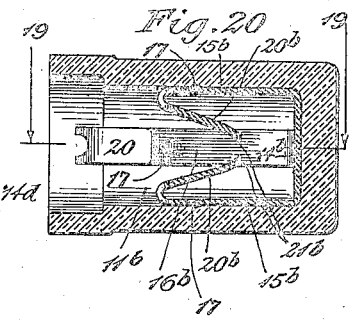
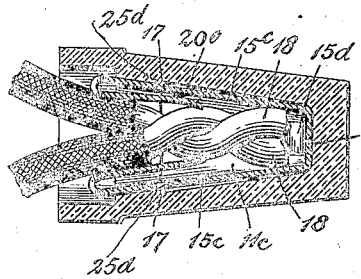
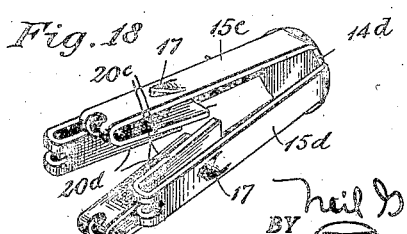
INVENTOR
BY
ATTORNEY Patented June 28, 1938

2,122,252

UNITED STATES PATENT OFFICE 2,122,252

WIRE CONNECTER

Neil G. Hayes, Bridgeport, Conn.

Application March 4, 1935, Serial No. 9,227

9 Claims. (Cl. 173—263)

This invention relates to connecters for electric wires of the type wherein the twisted ends of the wires at a splice are inserted in an insulating cap to be covered and insulated thereby and to be held in good electrical contact and against untwisting.

Heretofore it was proposed to accomplish this by providing screw threads on the internal wall of the insulating cap so as to cut into the wires as the cap was rotated on the twisted ends; but, in the use of this device, considerable time is taken up in screwing the cap onto the wire ends, especially if, due to carelessness or to a previous kink in the wire at the bared portion, the ends would not be twisted neatly together.

Further, with the type of connecter above referred to, a different connecter was required for wires of slightly different sizes and depending also upon the number of wires spliced together.

An object of the present invention is to provide a wire connecter which may be placed over the splice by a straight or rectilinear motion, and in which one single wire connecter will accommodate wires of substantially different sizes and splices containing different numbers of wires.

Another object of this invention is to provide a wire connecter which is economical to manufacture.

These objects are accomplished in the form of the invention herein disclosed, by providing in a recess in an insulating cap a resilient wire-gripping member having a pair of jaws converging toward each other and toward the bottom of the recess in which the member lies, so as to form a yielding constricted guide throat for receiving the twisted ends of the wires when they are forced into the cap and between said arms.

The pressure of the arms against the wire ends is sufficient to hold them in good electrical contact, and the arms so engage the wires that removal of the wires from the connecter by a straight line movement is prevented. However, the connecter can be removed by rotating it relative to the twisted ends of the wires, and at the same time pulling it outwardly so as to cause it to follow substantially the helix of the twisted wire ends.

It has been heretofore proposed that the wire ends be engaged by generally inwardly directed arms, but in these prior proposals the arms did not bite into the wires but were mechanically moved toward each other and against the wire by relative axial movement of the wire-gripping member relative to portions of the cap, and this movement was produced by rotating one member on another. With the present invention, it is merely necessary to push the wires into the constricted throat formed by the gripping arms to cover the wire ends and hold them in good electrical contact with each other.

Other features and advantages will hereinafter appear.

In the accompanying drawings, which show several forms of the invention—

Figure 1 is a longitudinal sectional view of one form of connecter made according to the present invention, showing the twisted wire ends in normal covered and connected position.

Fig. 2 is a view similar to Fig. 1, but showing the wire ends being withdrawn from the connecter by rotating movement.

Fig. 3 is a view similar to Figs. 1 and 2, showing the connecter without the wires inserted therein.

Fig. 4 is an end view of the insulating cap before insertion of the wire-gripping means.

Fig. 5 is a view similar to Fig. 4, but showing the wire-gripping means in place.

Fig. 6 is a perspective view of the wire-gripping means shown in Figs. 1, 2, 3 and 5.

Fig. 7 is a view similar to Fig. 3, but showing a modified form of this invention, the insulating cap being made of resilient rubber or the like.

Fig. 8 is an end view of the wire connecter shown in Fig. 7.

Fig. 9 is a view similar to Figs. 3 and 7, showing a modified form of this invention in which the insulating cap is made of resilient material and surrounded by a rigid ring to hold the cap against distortion under the influence of the wire-gripping member.

Fig. 10 is a side view of a modified form of wire-gripping member, in which the wire-engaging arms are provided on their surfaces with teeth to cut into the twisted wire ends and form threads thereon, but only when removing the connecter from the wire ends.

Fig. 11 is a view of a modified form of this invention, wherein the jaws are lanced out from the sides of the leaf springs forming the wire-gripping member, the twisted ends of the wires being shown in place.

Fig. 12 is an end view of the device shown in Fig. 11 before the wires are inserted.

Fig. 13 is a view similar to Fig. 11, without the wires being shown in place.

Fig. 14 is a perspective view of the wire-gripping member shown in Figs. 11 to 13.

Fig. 15 is an end view of another modified form of this invention, there being four wire-gripping jaws so as to engage the wire ends at four places.

Fig. 16 is a sectional view of the device shown in Fig. 15.

Fig. 17 is a view similar to Fig. 16, but showing the twisted wire ends in place in the connecter.

Fig. 18 is a perspective view of the wire-engaging member shown in Figs. 15 to 17.

Fig. 19 is another modified form of this invention, in which four wire-gripping jaws are em ved, one pair of jaws being inwardly displa .d relative to the other pair so as to engage the twisted wire ends at longitudinally spaced points thereon, the section being taken on the lines 19—19 of Fig. 20.

Fig. 20 is a view similar to Fig. 19, but taken on the line 20—20 of Fig. 19.

As shown in the accompanying drawings in Figs. 1 to 6, the wire connecter of this invention comprises a cap 10 generally cylindrical in shape and having a deep rectangular recess or cavity 11 opening at one end of the cap. The cap in the form shown in Figs. 1 to 5 is made of rigid insulating material such as "Bakelite" and the like, and at its open end has a circular cavity 12. Located in the cavity 11 there is a wire-gripping member 13 which, in the form shown, for the most part is U-shaped having a base 14 and legs 15, the former engaging an end wall 16 of the cap and the latter lying adjacent the walls of the cavity 11.

The wire-gripping member, in the form shown, is made of flat springy material of a width to snugly fit between the long walls of the cavity 11, and thus is held against rotation independently of the cap 10.

In the broader aspects of this invention, the wire-gripping member 13 may be held in the cavity by any suitable means, but, in the form shown, it is held in place by barbs 17 struck out from the legs 15 of the U-shaped member. To insert the wire-gripping member 13 in the cavity, it is merely necessary to push it in, with the base portion 14 foremost, until the latter engages the end wall 16 of the cavity. Due to the fact that the wire-gripping member is made of springy material and is normally biased to spring outwardly as shown in Fig. 6, when it is being inserted in the cavity the legs 15 spring outwardly, causing the barbs 17 to bite into the material of the cap and prevent the wire-gripping member from being withdrawn unintentionally.

To engage twisted ends 18 of wires 19 and hold them in good electrical contact and hold the cap over them, the wire-gripping member is provided with a pair of resilient jaws 21 which are formed by bending the ends of the legs 15 reversely and toward each other. Normally, the jaws 20 have their extremities 21 lying closely adjacent each other so that the jaws 20 form a yielding constricted guide throat into which the twisted ends 18 of the wires may be placed.

To apply the wire connecter of the present invention to the wire splice, it is merely necessary to insert the twisted ends 18 between the jaws 20 and by a straight line or rectangular movement force the device over the splice until, as shown in Fig. 1, the ends of the wires engage the base 14 of the wire-gripping member and the insulation 19a on the wire is located in the cavity 12 at the receiving end of the connecter.

I have found that by leaving sharp corners on the extremities 21 of the jaws 20, they bite into the wire when an attempt is made to withdraw the splice from the connecter by a straight-line movement, thus positively holding the connecter on the wire ends against casual removal.

In inserting the splice into the connecter, the jaws 20 merely expand over the tops of the wires in the twist and come to rest between the convolutions and no rotation of the cap on the wire is desirable or necessary to make a good connection, for the jaws 20, pressing against the opposite sides of the twisted ends, hold them in good electrical contact.

Sometimes it is desired to remove the wire connecter and splice cover to splice in any wire or a separate splice. This cannot be done with the device of the present invention by simply pulling the connecter off the wires, for the reasons above pointed out. However, it can be easily accomplished by rotating the connecter in the direction that the wire is twisted while at the same time pulling on the wire to cause the jaw ends 21 to remain between the high points of the twist, as shown in Fig. 2, and hence in position to bite into the high points of the twisted wires. When the movement of the device follows the helix of the twist, the device may be removed from the wire ends with very little effort.

To facilitate the bending of the jaws 20 from the legs 15, the material at the bend is removed as by the apertures 22.

With the device as arranged in Figs. 1 to 5, the mere resiliency of the wire-gripping member 13 need not be depended upon for holding the barbs 17 against the walls of the recess 11, for it will be observed that any pulling strain on the jaws 20 will tend to spread the outer ends of the legs 15 and increase the pressure of the barbs 17 against the walls.

If it is desired, the cap may be made of resilient material such as rubber. This is illustrated in Fig. 7, in which the rubber cap 23 is similar to the cap 10 in that it has a recess 24 to receive the wire-gripping member. Since the cap 23 is resilient, it may be provided with an annular internal flange 25 so as to overlie the junctions 26 of the legs 15a with the jaws 20a and thus hold the wire-gripping member 13a within the cavity against casual removal.

When the wire-gripping member is so formed as to be normally under tension, in a resilient cap, such as the cap 23 in Fig. 7, the spring pressure of the wire-gripping member distorts the cap and makes it appear oval from the wire-receiving end and in cross section as shown in Fig. 8.

To avoid this and still use the resilient cap, the device may be arranged as shown in Fig. 9, in which the cap 23a is provided with an annular groove 27 adapted to receive a rigid ring 28. After the wire-gripping member 13a is inserted in the cavity and located behind the annular flange 26, the ring 28 is forced over the body and caused to lie in the annular groove, thus keeping the cap round and holding it against distortion when wires are inserted between the jaws 20a.

If desired, the legs and base of the wire-gripping member may be connected by right-angle bends, as in Figs. 1 to 6, but they may also be arranged as shown in Figs. 7 to 10, in which the wire-gripping member 13a has a rounded base portion 14a.

Likewise, the terminal portions of the jaws may be flat and straight as shown in Figs. 1 to 6, or they may be slightly concave as shown in Figs. 7, 8 and 9, and in certain of these views marked 20a, better to fit the twisted wire ends.

If desired, the jaws may be provided with teeth 29 as shown in Fig. 10, in which case threads will be cut on the twisted wires as the wire splice and connecter are relatively rotated, and at the same time withdrawn from the device. When, as shown in Fig. 10, the teeth are directed downwardly and inwardly, however, no threads will be cut on the wire ends when they are inserted between the jaws, even though they should be rotated.

As will be observed from the accompanying drawings, there is substantial space between the terminal portions of the jaws 20 and the legs 15. This provision is made so that a single connecter made according to the present invention may be used to connect and cover a large variety of splices. For instance, it may be used with splices containing two wires of certain different sizes, or two or more wires of the same or different sizes over a large range. Therefore, with the present invention, the electrician does not need to have a number of different size connecters, nor to rummage through his supply for the particular one to use with a certain size and number of wires, but need have one size connecter serving practically all his ordinary needs. This is an extremely advantageous and important feature of the present invention.

As shown in Figs. 11 to 20, two pairs of jaws may be employed to better engage and grip the wire.

In the form of the invention shown in Figs. 19 and 20, the jaws 20b of the additional pair are spaced inwardly substantially with respect to the other jaws 20 with the practical result of engaging the twisted ends of the wires 18 at two longitudinally spaced points by the sharp corners 21 and 21b of the jaws 20 and 20b respectively, thus holding the connecter on the wire end against casual movement relative thereto.

It is preferable that the pairs of jaws be arcuately spaced from each other by right angles and that the leaf springs 15 of the jaws 20 and the leaf springs 15b of the jaws 20b be integrally connected by a single base portion 14b providing a unitary wire-gripping member to be inserted in the cap as such.

Further, in this embodiment of the invention, the recess 11b is preferably cylindrical for convenience in manufacture. The springs 15b and 16b each may have a barb 17 to bite into the wall of the recess, and thus cause the wire-gripping member to rotate with the cap when the latter is rotated relative to the twisted wire-ends to remove the connecter therefrom.

In the form of the invention shown in Figs. 15 to 18, two pairs of jaws are also employed, but these have their sharpened ends all lying in substantially the same transverse plane. Thus, when the wire ends 18 are inserted in the connecter, the wire is engaged by jaws 20c and 20d on four sides. To hold the connecter on the twisted wire ends 18 against rocking movements, the recess 11c is tapered toward the bottom so that the ends of the twisted wires will snugly fit into the bottom of the connecter and be engaged by the walls of the recess or by the leaf springs 15c and 15d carrying the jaws 20c and 20d respectively.

As shown in Fig. 17, two wires of ordinary size are inserted in the connecter. If the wires be of larger diameter or three or more wires be twisted together, then, of course, the ends will not enter the connecter so far but will strike the portion of the recess having substantially the diameter of the group of twisted wires. The leaf springs 15c and 15d are conneced by a base portion 14d, so as to form a unitary wire-gripping member.

In this form of the invention, the leaf springs are provided with barbs 17 to bite into the wall of the recess, but, to facilitate this and provide greater security against the wire-gripping member being unintentionally withdrawn from the recess, the latter is provided with a shoulder 25d against which the barbs may press.

In all cases it is not necessary to have the leaf spring provided with a reverse bend to produce the wire-gripping jaws. Other portions of the leaf springs may be arranged to bite into the wire.

For instance, as shown in Figs. 10, 11 and 13, the leaf springs 15e have wire-gripping jaws 20e lanced out from them and pressed inwardly to engage the twisted wire ends 18. In order that this engagement of the jaws with the wire ends may be assured and may yield so as to permit the wire to be inserted by a straight-line motion and to accommodate wires of different diameters or different numbers of wires, the leaf springs 15e are bowed inwardly, that is to say, away from the wall of the recess 11e, having their convex sides facing the wire and pressing the jaws 20e into biting relation with the wire ends.

Also, as in the other forms of this invention, the leaf springs 15e are preferably integrally connected together to form a unitary wire-gripping member 13e by a base portion 14e.

As in the other forms of the invention herein shown, the wire-gripping member 13e retains itself within the cap 10e against unintentional withdrawal, and for this purpose the outer ends 30 of the leaf springs engage a shoulder 25e on the cap 10e.

When the twisted wire ends are inserted in the restricted throat produced by the jaws or prongs 20e, the leaf springs 15e are pressed outwardly, that is, they are flattened out somewhat. To permit this without causing the leaf springs to buckle, the base portion 14e of the wire-gripping member 13e is not normally located against the bottom or end wall 16e of the recess, but is spaced therefrom as shown in Fig. 13. When the leaf springs 15e are flattened out somewhat, the distance between their ends is increased, and the base portion 14e moves toward the bottom wall 16e.

To cause the wire-gripping member 13e to rotate with the cap when the latter is rotated to remove the cap from the twisted wire ends, there are provided sharp corners 31 at the junctions of the leaf springs 15e with the base portion 14e. These sharp portions 31 tend to bite into the material of the cap and prevent relative rotation between the wire-gripping member and the cap.

Variations and modifications may be made within the scope of this invention and portions of the improvements may be used without others.

Having thus described the invention, what is claimed as new and for which it is desired to obtain Letters Patent, is:—

1. A connecter for a plurality of wire-ends spliced together by spiral twist, said connecter comprising an insulating cap having a deep recess therein, and means within said recess for causing such twist to be seized within the cap when said twist is merely endwisely inserted, said means including a metal member in said recess having a pair of oppositely disposed resilient jaws converging toward each other and the bottom of the recess, and at their inner ends lying closely adjacent to form a yielding constricted guide throat, said jaws being always so resiliently biased toward each other in said recess that such insertion of said twist into and through said throat must be a forcible one, the inner extremities of said jaws having sharp corners directed toward each other to bite into said twist thereby to prevent withdrawal thereof from the cap by rectilinear motion but to permit such withdrawal by mere spiral movement of the cap relative to the twist.

2. The invention as defined in claim 1, in which the said resilient jaws are connected together by an integral U-shaped portion fitting in the recess in the cap and said member has a direct interlocking connection with the cap to prevent unintentional withdrawal of the wire-gripping member from the cap.

3. The invention as defined in claim 1, in which the cap is made of rigid insulating material, in which said member has a U-shaped portion and in which there is interlocking means directly between the cap and the U-shaped portion of said member to retain said member in said recess against unintentional removal.

4. The invention as defined in claim 1, in which the cap is made of resilient insulating material, and in which said member has a U-shaped portion and such U-shaped portion is retained in the recess in the cap against unintentional separation by an internal annular flange on the cap engaging the portion of the wire-gripping member where said resilient jaws join the U-shaped portion.

5. The invention as defined in claim 1, in which the cap is made of resilient insulating material, and in which said member has a U-shaped portion and such U-shaped portion is retained in the recess in the cap against unintentional separation by an internal annular flange on the cap engaging the portion of the wire-gripping member where said resilient jaws join the U-shaped portion, and in which a rigid ring encircles the cap to hold the U-shaped portion against spreading when the wire ends are inserted between said resilient jaws.

6. A connecter for a plurality of wire-ends spliced together by spiral twist, said connecter comprising an insulating cap having a deep recess therein to provide a deep chamber open at its top and closed at its bottom, and means within the chamber for causing such twist to be seized within the cap when said twist is merely endwisely inserted into said chamber through the open end thereof, said means including a metal member having a pair of oppositely placed resilient jaws converging toward each other and the bottom of the chamber, said jaws at their inner ends lying closely adjacent to form a yielding and gradually increasingly constricted guide throat, said member having an integral U-shaped portion and the outer end lengths of the legs of the U being reversely bent to establish said jaws, said jaws being always so resiliently biased toward each other and away from the lengths of said legs from which the jaws are bent that insertion of said twist into and through said throat must be a forcible one, the inner ends of said jaws having sharp corners directed toward each other to bite into said twist at points within the spiral grooves established by said twist to prevent withdrawal of the twist from the cap by rectilinear motion but to permit such withdrawal by mere spiral movement of the cap relative to the twist.

7. A wire connecter comprising an insulating cap having a deep recess therein, and a wire-gripping member in said recess having two pair of oppositely disposed resilient jaws, the jaws of each pair converging toward each other and the bottom of the recess, and at their inner ends lying closely adjacent to form a yielding constricted guide throat for the twisted ends of wires forced by rectilinear motion between them and into the cap, the inner extremities of said jaws having sharp corners directed toward each other to bite into the wire-ends and prevent withdrawal thereof from the cap by rectilinear motion.

8. A wire connecter comprising an insulating cap having a deep recess therein, and a wire-gripping member in said recess having two pair of oppositely disposed resilient jaws, the jaws of each pair converging toward each other and the bottom of the recess, and at their inner ends lying closely adjacent to form a yielding constricted guide throat for the twisted ends of wires forced by rectilinear motion between them and into the cap, the inner extremities of said jaws having sharp corners directed toward each other to bite into the wire-ends and prevent withdrawal thereof from the cap by rectilinear motion, said corners being permanently held in wire-biting position solely by the walls of the recess engaging the wire-gripping member, the wire-engaging inner ends of one pair of jaws being substantially spaced from those of the other pair of jaws longitudinally of the recess.

9. The invention as defined in claim 1, in which the recess of the cap and the metal member therein taper inwardly so that the wall of the metal member may confine the inner end of the twisted wires against movement relative to the cap.

NEIL G. HAYES.